(12) United States Patent  
Eikenberry

(10) Patent No.: US 8,025,496 B2
(45) Date of Patent: Sep. 27, 2011

(54) STORAGE DEVICE FOR MOLD

(76) Inventor: Michael G. Eikenberry, Russiaville, IN (US)

( * ) Notice: Subject to any disclaimer, the term of this patent is extended or adjusted under 35 U.S.C. 154(b) by 570 days.

(21) Appl. No.: 11/766,692

(22) Filed: Jun. 21, 2007

(65) Prior Publication Data

US 2008/0314781 A1 Dec. 25, 2008

(51) Int. Cl.
*B29C 33/70* (2006.01)
(52) U.S. Cl. ........................................ 425/169; 425/317
(58) Field of Classification Search ............... 425/169, 425/317
See application file for complete search history.

(56) References Cited

U.S. PATENT DOCUMENTS

| 5,556,582 | A | * | 9/1996 | Kazmer ................. 264/40.1 |
| 5,571,539 | A | | 11/1996 | Starkey |
| 5,720,912 | A | | 2/1998 | Liehr et al. |
| 5,795,511 | A | * | 8/1998 | Kalantzis et al. ........... 264/40.6 |
| 6,256,881 | B1 | | 7/2001 | Starkey |
| 6,327,553 | B1 | | 12/2001 | Nishiyama et al. |
| 6,782,940 | B2 | | 8/2004 | Billiet et al. |
| 7,033,159 | B2 | | 4/2006 | Kachnic |
| 2004/0247724 | A1 | * | 12/2004 | Manner ................. 425/149 |
| 2007/0139915 | A1 | * | 6/2007 | Walters ................. 362/158 |

* cited by examiner

*Primary Examiner* — Joseph Del Sole
*Assistant Examiner* — James Sanders
(74) *Attorney, Agent, or Firm* — Foley & Lardner LLP

(57) ABSTRACT

According to an exemplary embodiment, a mold includes at least one plate and a storage device supported at the at least one plate. The storage device stores electronic information associated with the mold.

15 Claims, 3 Drawing Sheets

STORAGE DEVICE FOR MOLD

BACKGROUND

The present disclosure relates generally to the field of molds (e.g., molds for an injecting molding process, etc.). More specifically, the present disclosure relates to a storage device that is provided for storing information about the mold and the mold history.

During the life of an injection mold, repeated cycles may result in damage to the mold. The damage may be general wear caused by flowing material or may include more significant gouges, pits, nicks, or other surface defects. Such damage may require the mold to be repaired and/or replaced. To make such repairs and/or replacement, mold design files are often relied upon. Typically, mold design files are stored as electronic files. Over the life of a mold, the design files may be lost or destroyed or otherwise separated from the mold, resulting in costly re-design if the mold has to be replaced.

Thus, there is a need to provide a system for storing information with a mold. There is also a need to provide a storage device for an electronic mold design file that is housed within the mold. There is further a need to provide a storage device that interface with an external computer so that the information stored may be used to replace or repair a damaged mold. Further still, there is a need to provide a storage device that records information about the mold process over the life of the mold. Accordingly, it would be advantageous to provide a storage device that addresses one or more of the these needs or any other needs.

SUMMARY

One exemplary embodiment relates to a mold comprising at least one plate and a storage device supported at the at least one plate. The storage device stores electronic information associated with the mold.

Another exemplary embodiment relates to a mold comprising plate means and a storage means disposed at the plate means. The storage means electronically stores at least one of a mold design, a tool path and tooling information associated with the mold.

Another exemplary embodiment relates to a method of using an injection mold. The method comprises the steps of providing a mold having a storage device and storing at least one of a mold design, a tool path, or tooling information associated with the mold within the storage device.

DETAILED DESCRIPTION

Figure 1:
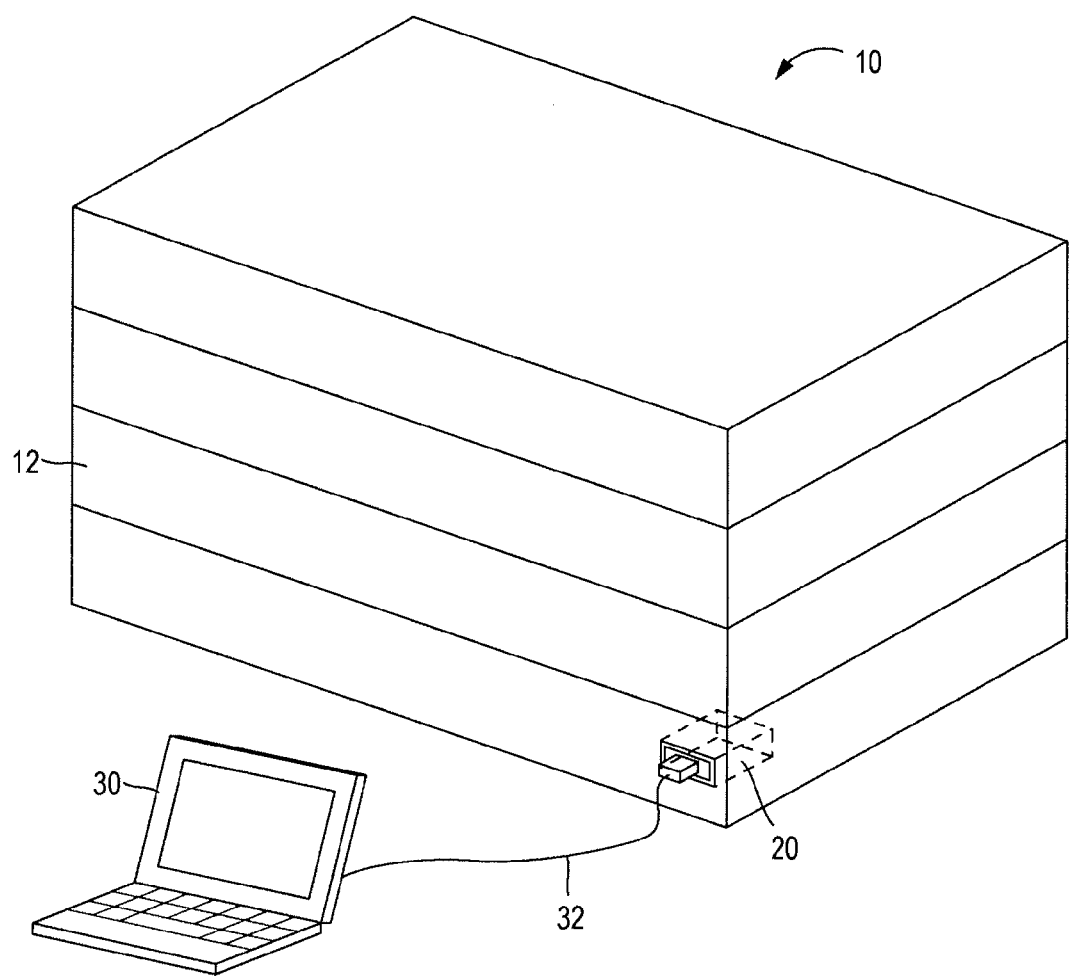
FIG. 1 is an isometric view of a mold with a storage device according to an exemplary embodiment.
Figure 2:
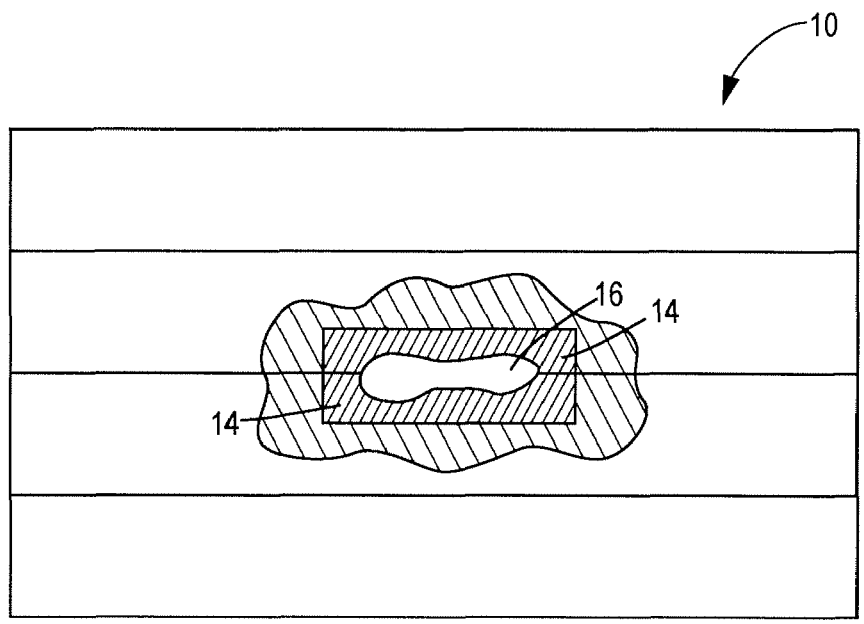
FIG. 2 is a schematic cross-section view of the mold in FIG. 1 showing the interior cavities.
Figure 3:
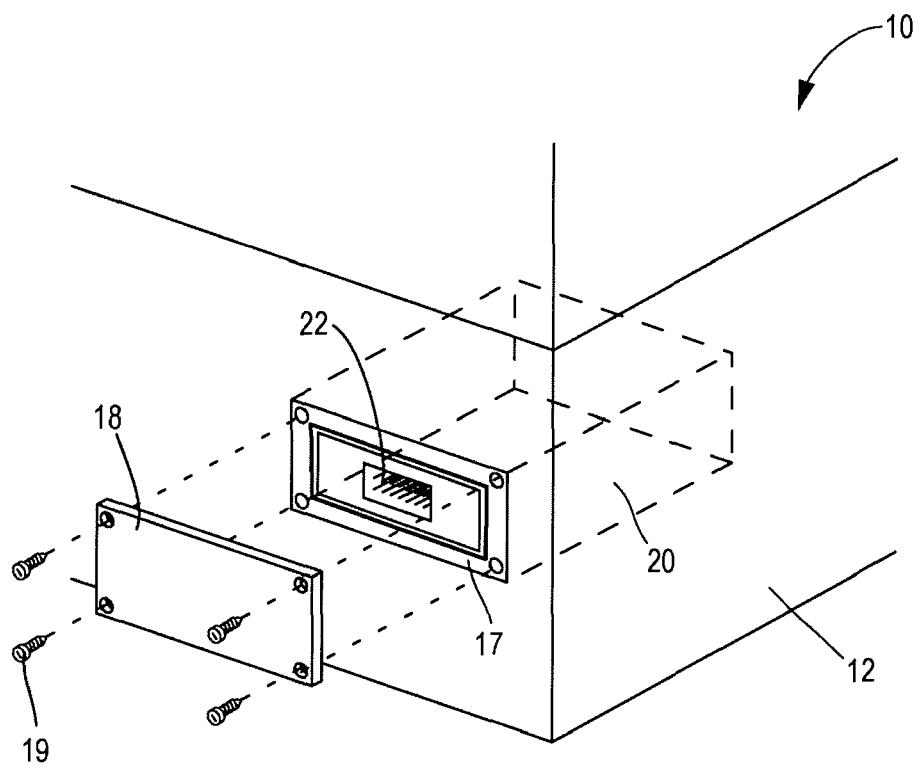
FIG. 3 is an exploded view of a portion of the mold in FIG. 1 showing a storage device according to an exemplary embodiment.
Figure 4:
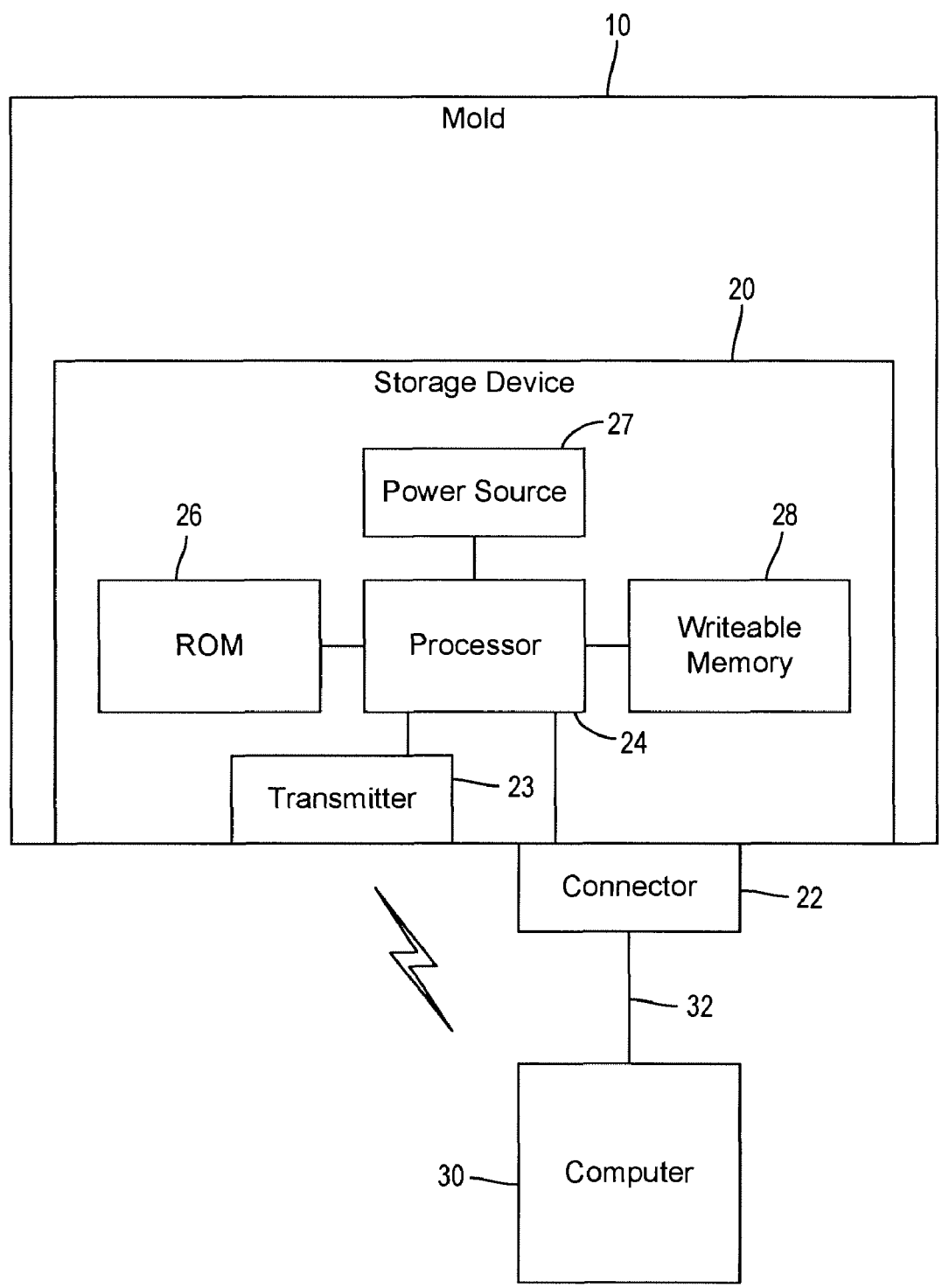
FIG. 4 is a block diagram of the storage device in FIG. 3.

Referring to FIGS. 1 and 2, a mold 10 (e.g., an injection mold, etc.) is shown according to an exemplary embodiment. The mold 10 can be formed from hardened steel, aluminum, or beryllium copper or other mold material. The mold 10 forms one or more cavities 16 that are configured to receive a molten polymer that is injected into the mold. As the polymer cools it solidifies into the shape of the cavity 16 to form a part. The mold 10 is then opened so the part may be removed. The mold 10 may include multiple plates 12 (e.g., layers, sections, etc.) and multiple cavities 16. One or more of the cavities 16 may be provided in the inserts 14. The inserts 14 are bodies that are separate from the main body of the mold 10 and may be replaced without replacing the main body of the mold 10.

Mold 10 may be used to create a large amount of polymer parts over many molding cycles. The friction caused by the molten polymer flowing into the mold may wear away at the surface of the cavity 16. The cavity 16 may also be damaged with gouges, pits, nicks, or other surface defects. The mold 10 may be periodically repaired or replaced as the cavities 16 become damaged.

A storage device 20 is provided in the mold 10 and is configured to retain electronic information (e.g., in the form of electronic data or electronic files) about the mold 10. According to an exemplary embodiment, the storage device 20 is substantially enclosed by one of the plates 12 of the mold 10 and includes an interface or connector 22 (e.g., port, plug, socket, etc.) that is accessible through an opening in the mold 10. Alternatively, the storage device 20 may be located on a housing or plate associated with mold 10. The connector 22 is configured to receive a cable 32 that connects the storage device 20 to an external computer 30 that is configured to read the information stored on the storage device 20.

According to various exemplary embodiments, the cable 32 may be a serial cable, parallel cable, universal serial bus (USB) cable, IEEE 1394 cable or any other suitable data transfer cable. According to still other exemplary embodiments, the storage device 20 may have a wireless transmitter 23 instead of or in addition to a connector 22 and communicate with an external computer wirelessly with an infrared or other suitable signal.

A cover 18 (e.g., faceplate, door, etc.) is provided to enclose and protect the storage device 20 from grease, moisture or other contaminants. According to an exemplary embodiment, the cover 18 is coupled to the mold 10 with one or more fasteners, shown as screws 19. A sealing member 17 (o-ring, gasket, etc.) may be provided around the circumference of the opening in the mold 10. The sealing member 17 is compressed between the cover 18 and the plate 12 when the cover 18 is coupled to the plate 12 to further isolate the storage device 20 from the outside environment.

According to an exemplary embodiment, the storage device 20 is provided within a cavity in one of the plates 12 associated with the mold 10. The cavity can be insulated to protect the storage device 20 from vibration and heat. According to another exemplary embodiment, the cavity for the storage device 20 is disposed in two plates. In such an embodiment, the storage device 20 can be inserted into the mold 10 after the plates 12 are assembled.

According to an exemplary embodiment, the storage device 20 can simply be a Flash memory stick drive or other storage system. A laptop or other computer can interface with the storage device 20 through the connector 22 to provide data to be stored within the mold 10. According to an exemplary embodiment, the data stored on storage device 20 includes a mold ID, a date of manufacture and/or a date of installation. The data can also include files that define a mold design, a cutter path, or any other tooling information. The laptop or other computer can periodically update the storage device 20 with new information such as the amount of use of the mold 10.

According to another exemplary embodiment, the storage device 20 includes a processor 24, read-only memory 26, writeable memory 28, and a power source 27. The processor 24 is coupled to the read-only memory 26 and the writeable memory. The read-only memory (ROM) 26 is configured to store static information including, but not limited to, the mold design, the tool cutter path used to create the mold, and any other tooling information. If one or more of the cavities 16 on the mold 10 are damaged, the information on the read-only memory 26 may be retrieved by an external computer so that the cavity 16, the plate 12 and/or the entire mold 10 may be replaced. The power source 27 can be a battery or a cable that extends to an outside source. According to an exemplary embodiment, the power source 27 is recharged when the mold 10 is not in use.

The writeable memory 28 of the storage device 20 is programmable memory that is configured to record information about the mold 10 over the life of the mold 10. A processor 24 is included that receives information from a plurality of sensors and stores information on the writeable memory 28. According to various exemplary embodiments, the processor 24 may be a programmable processor (e.g., FPGA, PAL, PLA, etc.) or a commercially available predefined processor. The writeable memory 28 may store the number of mold cycles, mold temperature variations, mold pressure variations, clamp tonnages, ejection efforts, cycle time, time variations between cycles, shelf time, and time between storage and first shot. Information stored on the writeable memory may be retrieved by an external computer.

According to an exemplary embodiment, the mold 10 includes at least one pressure sensor, and at least one temperature sensor to record parameters associated with the mold 10. The sensors can be located in the cavities associated with the storage device 20. Alternatively, the sensors can be located closer to the cavity 16, or include probes that extend to cavity 16.

In yet another exemplary embodiment, the storage device 20 includes a clock for recording mold time data. The clock can be a processor associated with the storage device 20 or can be a separate circuit. The clock can be used to record shelf life and alarm when the life of the mold is exceeded.

Although the processor 24, the read-only memory 26 and the writeable memory 28 are shown as digital components it should be understood that according to various exemplary embodiments they may be analog components or a mixture of digital and analog components.

According to an exemplary embodiment, the electronic information stored on the storage device 20 is in a form for use by mold design software.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

The construction and arrangement of the elements of the mold and the storage device as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the mold may be constructed from any of a wide variety of materials that provide sufficient strength or durability in any of a wide variety of shapes, combinations and suitable materials. Other substitutions, modifications, changes and omissions may be made in the design, operating conditions and arrangement of the preferred and other exemplary embodiments without departing from the scope of the present inventions. The order or sequence of any process or method steps may be varied or re-sequenced according to alternative embodiments. Other substitutions, modifications, changes and omissions may be made in the design, operating configuration and arrangement of the preferred and other exemplary embodiments without departing from the spirit of the present inventions as expressed herein.

What is claimed is:

1. A mold comprising:
   at least one plate at least partially defining at least one cavity;
   a storage device supported at the at least one plate and configured to store electronic information associated with the mold; and
   a mold design file electronically stored on the storage device, the mold design file including information about a tool cutter path that was used to create the mold,
   wherein the mold design file is configured to be retrieved by an external device and used by a tool maker to recreate the mold in the event that the at least one cavity is damaged and needs to be repaired or replaced.

2. The mold of claim 1 wherein the external device comprises a computer.

3. The mold of claim 1 further comprising a connector coupled to the storage device for communicating information from the storage device to the external device.

4. The mold of claim 3 wherein the storage device is disposed within an aperture defined by the at least one plate.

5. The mold of claim 4 wherein the storage device and the connector are covered by a door configured to be selectively moved between an open position and a closed position.

6. The mold of claim 5 further comprising a seal provided between the door and the at least one plate to at least partially insulate the storage device and the connector.

7. The mold of claim 1 wherein the mold is an injection mold for forming a product in a mold cavity formed by a plurality of inserts associated with the at least one plate.

8. The mold of claim 1 wherein the storage device is a non-volatile memory.

9. The mold of claim 8 wherein the storage device includes a processor.

10. A mold comprising:
    plate means at least partially defining at least one cavity; and
    a storage means disposed at the plate means; and
    a mold design file electronically stored on the storage means, the mold design file including information about a tool cutter path that was used to create the mold,
    wherein the mold design file is configured to be retrieved by an external device and used by a tool maker to recreate the mold in the event that the at least one cavity is damaged and needs to be repaired or replaced.

11. The mold of claim 10 further comprising sensor means for sensing a parameter associated with the mold and providing a signal to the storage means.

12. The mold of claim 10 wherein parameter is at least one of a temperature and a pressure parameter.

13. The mold of claim 10 further comprising:

a communication port means for communicating information from the storage means to the external device.

14. The mold of claim 13 wherein the communication means is selectively covered by a sealed door.

15. The mold of claim 10 wherein the external device comprises a computer.

* * * * *